No. 763,760. PATENTED JUNE 28, 1904.
E. IMPERIALE.
MOTOR DRIVEN CULTIVATOR
APPLICATION FILED JUNE 27, 1903.
NO MODEL. 4 SHEETS—SHEET 2.

WITNESSES:
A. C. Abbott
Isaac B. Owens.

INVENTOR
Eduardo Imperiale
BY
ATTORNEYS.

No. 763,760. PATENTED JUNE 28, 1904.
E. IMPERIALE.
MOTOR DRIVEN CULTIVATOR.
APPLICATION FILED JUNE 27, 1903.
NO MODEL. 4 SHEETS—SHEET 3.

WITNESSES:
H. C. Abbott
Isaac B. Owens

INVENTOR
Eduardo Imperiale
BY
ATTORNEYS.

No. 763,760. PATENTED JUNE 28, 1904.
E. IMPERIALE.
MOTOR DRIVEN CULTIVATOR.
APPLICATION FILED JUNE 27, 1903.
NO MODEL. 4 SHEETS—SHEET 4.

WITNESSES:
W. C. Abbott
Isaac B. Owens

INVENTOR
Eduardo Imperiale
BY
ATTORNEYS

No. 763,760. Patented June 28, 1904.

UNITED STATES PATENT OFFICE.

EDUARDO IMPERIALE, OF NAPLES, ITALY.

MOTOR-DRIVEN CULTIVATOR.

SPECIFICATION forming part of Letters Patent No. 763,760, dated June 28, 1904.

Application filed June 27, 1903. Serial No. 163,337. (No model.)

*To all whom it may concern:*

Be it known that I, EDUARDO IMPERIALE, a subject of the King of Italy, and a resident of Naples, Italy, have invented a new and Improved Motor-Driven Cultivator, of which the following is a full, clear, and exact description.

This invention relates to an apparatus for cultivating land, said apparatus comprising a cultivating tool or tools mounted on a wheeled frame and a motor connected by suitable gearing with the tool or tools and with the traction-wheels, so that the tools may be operated and the vehicle propelled over the ground to follow the operation of the tools.

This specification is an exact description of one example of my invention, while the claims define the actual scope thereof.

Reference is to be had to the accompanying drawings, forming a part of this specification, in which similar characters of reference indicate corresponding parts in all the views.

Figure 1:
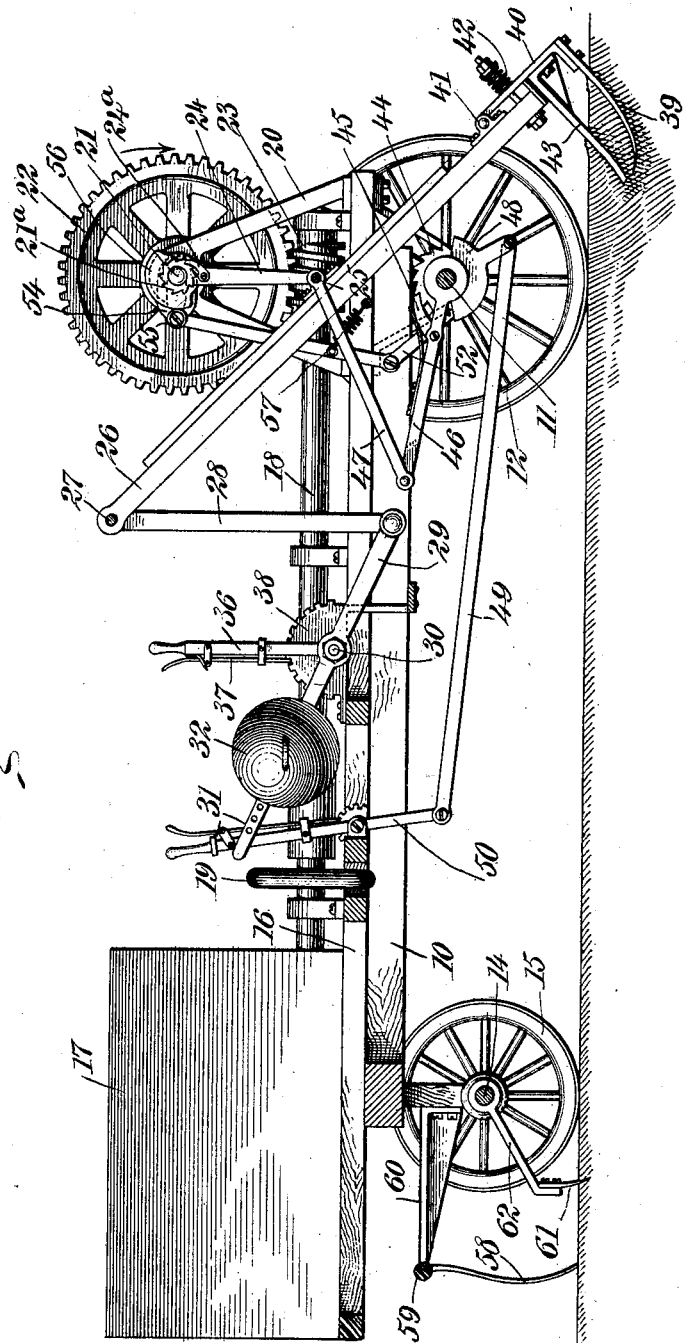
Figure 2:
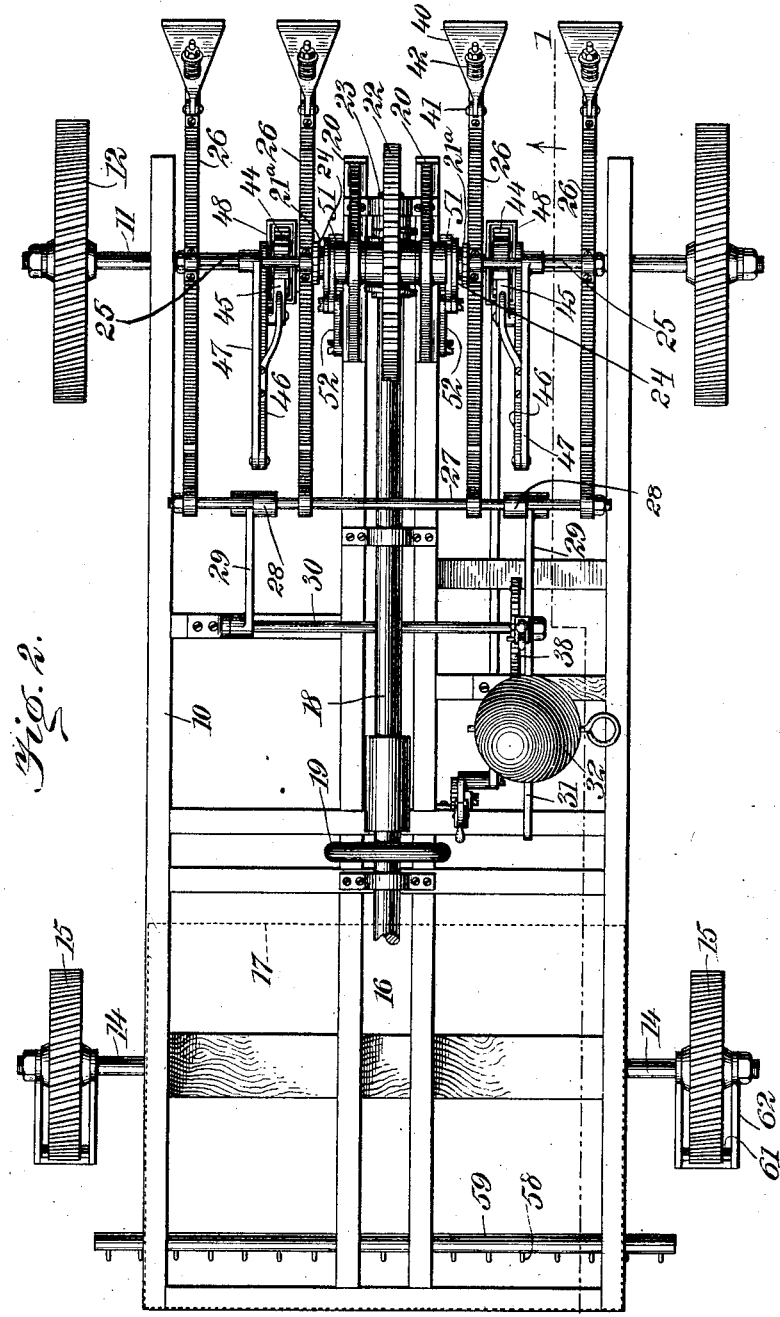
Figure 3:
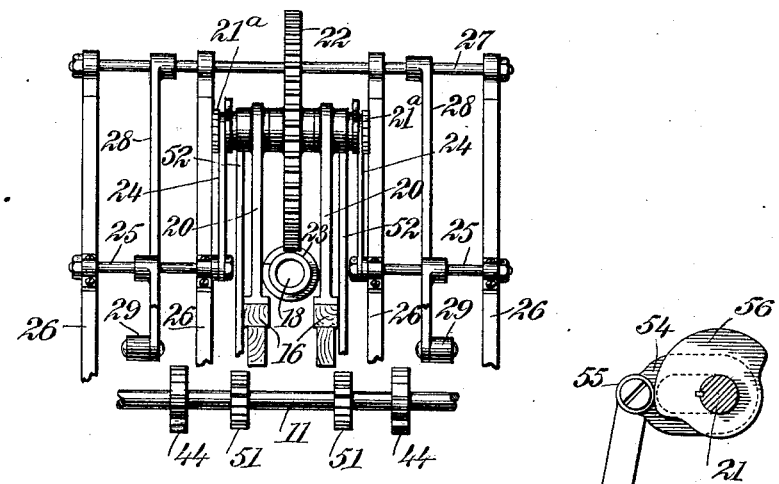
Figure 4:
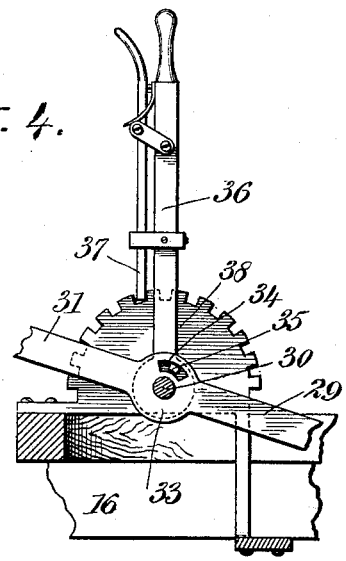
Figure 5:
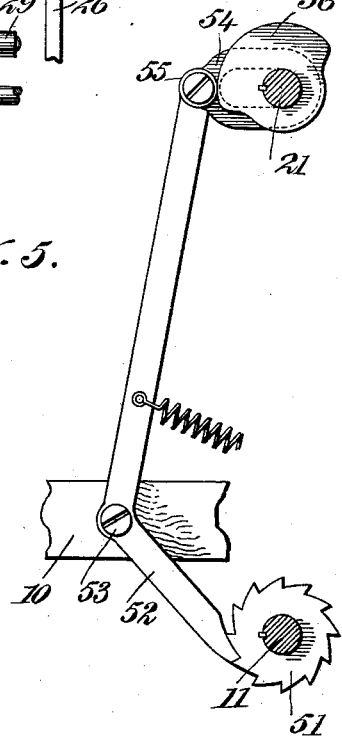
Figure 6:
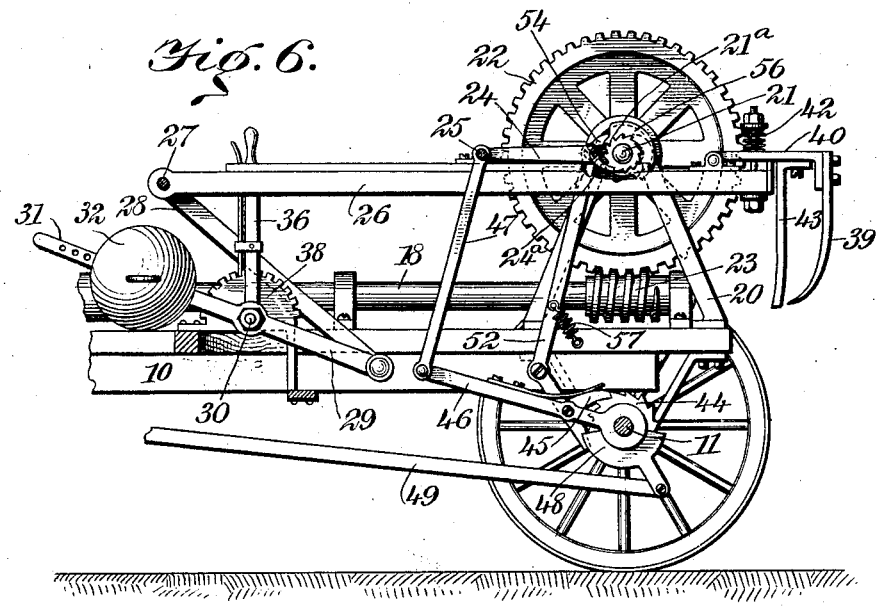
Figure 7:
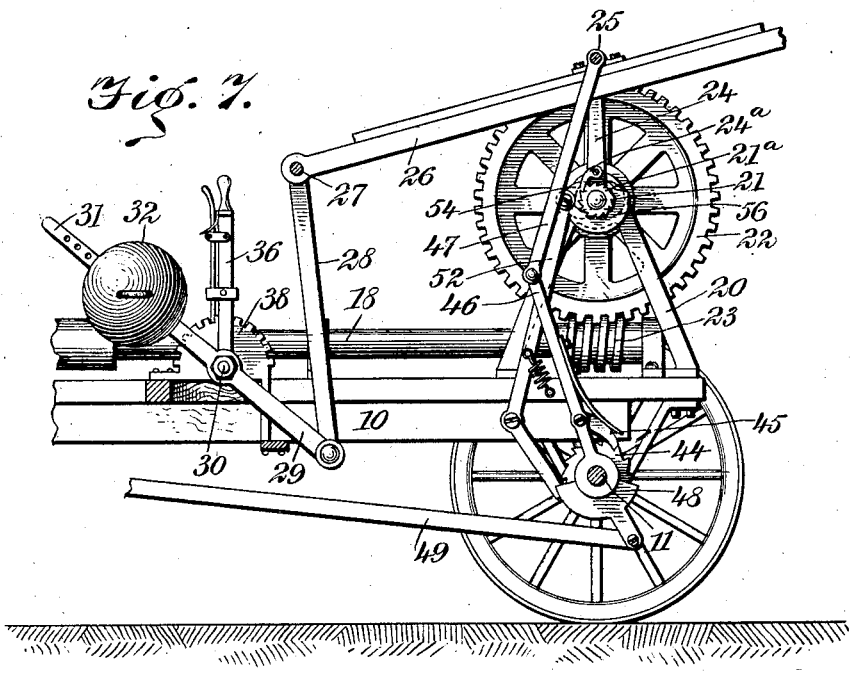

Figure 1 is a sectional side elevation of the apparatus on the line 1 1 in Fig. 2. Fig. 2 is a plan view thereof. Fig. 3 is a fragmentary rear elevation showing the manner of mounting and driving the cultivating device. Fig. 4 is a detail view of the means for adjusting said device. Fig. 5 is a detail view of the device for periodically arresting the forward movement of the apparatus while the cultivating device is occupied with the soil, and Figs. 6 and 7 are fragmentary elevations of the front end of the machine and illustrating particularly the various positions of the digging-tool beam and the devices for operating and controlling the same.

10 indicates the main framing of the apparatus, which is provided with a front axle 11, having traction-wheels 12 thereon, and a rear axle 14, having steering-wheels 15 thereon. On top of the main frame 10 a supplemental frame 16 is mounted, this frame carrying at its rear portion a case 17, containing a motor, which may be of any desired form. 18 indicates the shaft of the motor, which extends forwardly to the front end of the vehicle, and 19 indicates a balance-wheel on the shaft 18.

Mounted in suitable supports 20, rising from the supplemental frame 16, is a short horizontal shaft 21, on which is fastened a worm-wheel 22 in mesh with a worm 23, fastened to the shaft 18, this worm imparting a continuous motion to the shaft 21 in the direction of the arrow in Fig. 1.

At each end of the shaft 21 are arranged two loose arms 24, which carry spring-pawls $24^a$, arranged to engage ratchets $21^a$, fastened to the shaft 21. The arms 24 are pivotally connected, respectively, to horizontal shafts 25, (see Figs. 1 and 3,) each carrying two beams 26, which are pivoted on the shafts 25 at points intermediate the ends of the beams.

The beams 26 are connected at their upper and rear ends by means of a horizontal shaft 27, which extends across the machine and has two links 28 pivotally connected thereto. The links 28 extend downward and are pivotally connected, respectively, with arms 29, fastened to a rock-shaft 30, suitably mounted at approximately the middle of the apparatus and extending transversely, as shown in Figs. 1 and 2. An arm 31 projects from the shaft 30 oppositely with respect to the arms 29, and said arm 31 is located at one end of the shaft 30, being preferably formed integral with the adjacent arm 29. On this arm 31 is adjustably placed a counterweight 32, this weight tending to throw upward the front ends of the arms 29 and rendering elastic the action of the two cultivating devices, as will be fully described hereinafter. As best shown in Fig. 4, the hub 33 of the arm 31 and the adjacent arm 29 is formed with an arc-shaped slot 34 therein, and in this slot plays loosely a stud 35, fastened to a hand-lever 36, which is loosely mounted on the shaft 30 and carries a hand-pawl 37, coacting with a toothed quadrant 38, the latter being suitably fastened to the framing of the apparatus. By adjusting the arm 36 the inclination of the arms 29 may be regulated at will, this being effected through the action of the stud 35 against the walls of the slot 34, and it will be observed that after the desired adjustment is secured the said slot will allow the arms 29 that freedom of movement necessary to the operation of the beams 26. The counterweight 32 tends to throw down the digging-tools, and hence the tools are kept yieldingly in a downward position, enabling them to give or yield upward as they strike the ground, thus avoiding the jarring or racking of the various parts of the apparatus which would occur were the tools unyieldingly connected with the driving parts.

The cultivating-tools 39 are arranged one at the forward end of each beam 26 and are respectively attached to shanks 40, which extend over the upper sides of the beams and are pivoted thereto, as indicated at 41. 42 indicates springs for yieldingly holding the tools 39 in position, and 43 indicates colter-blades which are fastened to the shanks of the respective tools 39 and act therewith very much the same as the colters in plows and cultivators of the usual construction. The wheel 22 and shaft 21 being revolved by the worm 23 in the direction of the arrow shown in Fig. 1, the ratchets $21^a$ and pawls $24^a$ will lift the arms 24 until they stand perpendicular from the shaft 21, whereupon the arms 24 will fall by gravity, the pawls $24^a$ running ahead of the ratchets $21^a$ until the arms 24 again reach the position shown in Fig. 1, whereupon the above-described action is repeated. The crank-arms 24 in moving rearward and upward draw the tools 39 rearward from the position shown in Fig. 1 and lift them out of the ground, raising the beams bodily until the arms 24 reach a position directly above that shown in Fig. 1, or, in other words, perform a half-revolution. The descent of the beams 26 will begin with the descent of the arms 24, and the parts will then return to the position shown in Fig. 1, where a second incision will be made by the tools and colter.

It is necessary to drive the vehicle to cause it to follow the working of the cultivator-tool; but in this connection it should be remembered that during the time that the tool is active—i. e., actually engaged in digging—the vehicle itself must be brought to a standstill. According to my invention as the tool is raised from the ground the propelling devices become active, and thus the vehicle is first moved a step. Then the digging-tool performs one operation, after which the vehicle is again moved a step, and so on throughout the operation of the machine. The means for effecting this result will now be described. The driving or front axle 11 is provided with two ratchet-wheels 44, keyed thereto and coacting with spring-pressed pawls 45, carried on levers 46, which swing loosely around the axle 11. The front ends of said levers 46 are connected to the shafts 25 by means of links 47. Therefore as the shafts 25 move with the arms 24 the levers 46 are rocked and the pawls 45 are moved forward, so as to impart a forward movement to the traction-wheels through the medium of the ratchets 44. This driving movement takes place as the beams 26 and tools 39 are ascending, and thus it will be seen that the forward steps of the vehicle are brought about while the digging-tool is inactive. When, however, the tools descend into the earth, the levers 46 are rocked downward and the pawls 45 are moved over the ratchets 44 to recover their positions thereon. In order to limit the throw of the pawls 45, and thus limit the length of the step-by-step movement of the vehicle, I provide for each ratchet 44 a hood 48. These hoods partly inclose the peripheries of the ratchets and are arranged to move around the axle 11 toward and from the pawl, the relative construction of the pawls and hoods being such that as the pawls engage the hoods the former are thrown upward out of engagement with the ratchets. The hoods 48 may be moved to and held at any desired adjustment by any suitable means. For example, they may be connected with rods 49, extending rearward and adjustably fastened to the framing through the medium of a hand-lever 50, so that by manipulating this lever the desired position of the hoods 48 may be secured, and consequently the length of the steps taken by the apparatus regulated at will.

In order to prevent idle movement of the vehicle during the time that the propelling devices are inactive and the cultivating devices active, I provide ratchets 51, which are preferably two in number and fastened to the axle 11. With these ratchets coact the lower ends of the respective levers 52, which are fulcrumed at 53 on the frame 10 and extend upward to the shaft 21. The upper ends of the levers 52 are provided with loops 54, pivoted to the levers and sliding transversely on the shaft 21. Said levers are also provided with antifriction-rollers 55, which coact with cams 56, fastened to the shaft 21. These cams working with springs 57, connected at one end with the frame 10 and at the other end with the levers 52, (see Fig. 1,) throw the levers 52 back and forth, causing their lower ends to engage and disengage the ratchets 51. When the parts 51 and 52 are engaged, the axle 11 is locked against forward movement, and hence the vehicle cannot be propelled. The cams 56, which are the positively-acting elements and move the levers into position to lock the drive-axle, are so timed with respect to the other parts that the levers 52 will be moved to engage the ratchets 51 during the period that the pawls 45 are moving to recover and the devices 39 are actually engaged with the earth. At the rear of the vehicle I provide a number of rake-tines 58, which are attached to a transverse bar 59, supported horizontally by means of brackets 60, suitably attached to the vehicle. Reference to the drawings, particularly to Fig. 2, will show that the action of the digging device is confined to a width equal to that between the wheels of the vehicle. For operating upon that part of the earth over which the wheels move I provide auxiliary cultivator-tools 61, which are held by U- shaped brackets 62 to the hubs of the rear wheels 15, these auxiliary cultivator-tools projecting into the earth and turning over that part which otherwise would be packed down by the wheels 12 and 15.

The manner of using the invention will be fully understood by persons skilled in the art, and no special description is therefore required. The cultivating-tools work rapidly and effectively at the front of the vehicle, and each time that these tools are moved to regulate—i. e., to engage a second part of the earth—the vehicle is advanced in order to place the tools over the new area to be worked thereby, the tools and the vehicle-driving means acting alternately, as has been explained. This apparatus is controlled by a single man and will perform the work heretofore performed by several men each with a separate team of horses. The tools rapidly and thoroughly cultivate the earth, the cultivation being much more regular and thorough than in the ordinary practice.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination with a wheeled frame, of a motor-shaft, a worm thereon, a worm-wheel with which the worm is meshed, a rotary shaft carrying the worm-wheel, a crank-arm driven from the rotary shaft, a beam pivotally connected to the crank-arm intermediate the ends of the beam, a tool carried at one end portion of the beam, and means in connection with the other end of the beam for restraining the same within certain limits.

2. The combination with a wheeled frame, of a motor-shaft, a worm thereon, a worm-wheel with which the worm is meshed, a rotary shaft carrying the worm-wheel, a crank-arm driven from the rotary shaft, a beam pivotally connected to the crank-arm intermediate the ends of the beam, a tool carried at one end portion of the beam, and means in connection with the other end of the beam for restraining the same within certain limits, said means for restraining the beam being adjustable to vary the throw thereof.

3. The combination with a wheeled frame, of a motor-shaft, a worm thereon, a worm-wheel with which the worm is meshed, a rotary shaft carrying the worm-wheel, a crank-arm driven from the rotary shaft, a beam pivotally connected to the crank-arm intermediate the ends of the beam, a tool carried at one end portion of the beam, and means in connection with the other end of the beam for restraining the same within certain limits, said means comprising a link in connection with the beam, a swinging arm connected to the link, and means for adjusting the arm around its axis.

4. The combination with a wheeled frame, of a motor-shaft, a worm thereon, a worm-wheel with which the worm is meshed, a rotary shaft carrying the worm-wheel, a crank-arm driven from the rotary shaft, a beam pivotally connected to the crank-arm intermediate the ends of the beam, a tool carried at one end portion of the beam, means in connection with the other end of the beam for restraining the same within certain limits, said means comprising a link in connection with the beam, a swinging arm connected to the link, means for adjusting the arm around its axis, a third arm in connection with the second-named arm, and a counterweight attached to the third arm for the purpose specified.

5. In an agricultural machine, the combination of a tool, means for mounting and driving the same to move it vertically toward and from the earth, a counterweight for the purpose specified, and connections between the counterweight and tool.

6. In an agricultural machine, the combination of a tool, a beam to which the same is fastened, a means for operating the beam and tool, said means being pivotally connected to the beam intermediate its ends, two connected arms swinging around a common axis, a weight attached to one arm, and a connection between the other arm and the beam.

7. The combination of a swinging arm, a beam pivotally connected thereto intermediate its ends, a tool mounted on one end portion of the beam, two connected arms, a weight attached to one of said arms, and a connection between the other of said connected arms and the second end of the beam.

8. An agricultural machine, comprising a beam, means for mounting the same to move toward and from the ground, motor-driven means for continuously operating the beam, a cultivating-tool carried by the beam, and a colter-blade also carried by the beam ahead of the cultivating-tool.

9. An agricultural implement, comprising a wheeled frame, a shaft mounted thereon, means for driving the shaft, an arm attached to each end of the shaft and swinging therewith, a beam in pivotal connection with each arm, a connection between the beams to cause them to move in unison, a tool mounted on each beam, and means for restraining the beams within certain limits.

10. In an agricultural implement, the combination with the frame, of a rotary shaft mounted thereon, means for driving the shaft, an arm attached to the shaft, a beam pivoted to the arm intermediate the ends of the beam, a tool attached to one end of the beam, and a restraining means in connection with the other end of the beam.

11. In an agricultural implement, the combination with the frame, of a rotary shaft mounted thereon, means for driving the shaft, an arm attached to the shaft, a beam pivoted to the arm intermediate the ends of the beam, a tool attached to one end of the beam, a restraining means in connection with the other end of the beam, said restraining means comprising an arm having connection with the beam, a second arm, means connecting the two arms, such means allowing a limited independent movement thereof, and means for holding the second-named arm adjustably in place.

12. The combination with a wheeled frame, of a ratchet in connection with the driving-axle thereof, a pawl coacting with the ratchet, a swinging member carrying the pawl, a tool mounted on the frame, and means for operating said swinging member and tool.

13. The combination with a wheeled frame, of a ratchet in connection with the driving-axle thereof, a pawl coacting with the ratchet, a swinging member carrying the pawl, a tool mounted on the frame, means for operating said swinging member and tool, and a lock device driven from the actuating means and serving to lock the driving-axle when the pawl is moved to recover its engagement with the ratchet.

14. The combination of a wheeled frame, a ratchet in connection with the driving-axle thereof, a pawl coacting with the ratchet, a swinging member carrying the pawl, a revoluble shaft, means for driving the shaft, an arm having connection with the shaft, a beam pivoted to the arm intermediate the ends of the beam, a link connecting the said swinging member and the pivot between the arm and beam, a tool carried by the beam, and means in connection with the beam to limit the swinging movement thereof.

15. The combination of a wheeled frame, a ratchet in connection with the driving-axle thereof, a pawl coacting with the ratchet, a swinging member carrying the pawl, a revoluble shaft, means for driving the shaft, an arm having connection with the shaft, a beam pivoted to the arm intermediate the ends of the beam, a link connecting the said swinging member and the pivot between the arm and beam, a tool carried by the beam, means in connection with the beam to limit the swinging movement thereof, and a lock device operated from the said rotary shaft and adapted to prevent the rotation of the said driving-axle during the period that the pawl is moving to recover its engagement with the ratchet.

16. The combination with a frame, of a revoluble shaft, means for driving the same, an arm loosely mounted on the shaft, means acting between the shaft and arm to raise the arm upon the rotation of the shaft, a cultivator-tool, and means mounting said tool on the arm, the arm and tool falling by gravity to act on the ground.

17. A motor-driven agricultural implement, comprising a wheeled vehicle, a mounted tool thereon, a rotating shaft driven from the motor, an arm attached to and swinging with said shaft and having connection with the tool to operate it, means for imparting intermittent movement to the driving-axle of the vehicle, a connection between said means and the swinging arm, the tool and driving-axle being alternately operated, and a stop automatically actuated from said rotating shaft and serving to lock the driving-axle during the inactive period of the means for imparting driving movement thereto.

18. A motor-driven agricultural implement, comprising a wheeled vehicle, a mounted tool thereon, a rotating shaft driven from the motor, an arm attached to and swinging with said shaft and having connection with the tool to operate it, means for imparting intermittent movement to the driving-axle of the vehicle, a connection between said means and the swinging arm, the tool and driving-axle being alternately operated, a stop automatically actuated from said rotating shaft and serving to lock the driving-axle during the inactive period of the means for imparting driving movement thereto, the said stop comprising a ratchet on the driving-axle, a member movable toward and from the ratchet, and a cam on the rotating shaft, the cam acting on said member to operate it.

19. A motor-driven agricultural implement, comprising a wheeled vehicle, a mounted tool thereon, a rotating shaft driven from the motor, an arm attached to and swinging with said shaft and having connection with the tool to operate it, means for imparting intermittent movement to the driving-axle of the vehicle, a connection between said means and the swinging arm, the tool and driving-axle being alternately operated, a stop automatically actuated from said rotating shaft and serving to lock the driving-axle during the inactive period of the means for imparting driving movement thereto, the stop comprising a ratchet on the vehicle-axle, an elbow-lever one end of which is movable toward and from the ratchet, a loop or slide attached to the other end of the lever, and mounted on the said rotating shaft transversely thereof, and a cam attached to the shaft adjacent to the loop or slide and engaging the second end of the lever.

20. In a motor-driven agricultural implement, the combination with a wheeled frame, of a motor-shaft, a worm driven therefrom, a worm-wheel meshed with the worm, a rotary shaft carrying the worm-wheel, a crank-arm driven from the rotary shaft, a beam pivotally connected to the crank-arm intermediate the ends of the beam, a tool carried at one end portion of the beam, means in connection with the other end of the beam for restraining the same within certain limits, and a yielding means having connection with the beam, for the purpose specified.

21. In an agricultural implement, the combination of a revolubly-driven shaft, a swinging arm connected therewith, a beam to which the arm is pivoted at a point intermediate the ends of the beam, a tool mounted on one end portion of the beam, and a yielding means in connection with the other end portion of the beam to actuate the same, for the purpose specified.

22. In an agricultural implement, the combination of a revolubly-driven shaft, a swinging arm connected therewith, a beam to which the arm is pivoted at a point intermediate the ends of the beam, a tool mounted on one end portion of the beam, a yielding means in connection with the other end portion of the beam to actuate the same, for the purpose specified, and means also in connection with the second-named end of the beam to restrain the movement thereof within certain limits.

23. In an agricultural implement, the combination with a support, of a beam, a tool carried at one end thereof, means for driving the beam, said means having connection therewith intermediate its ends, a weight for the purpose specified, and means for connecting the weight with the beam.

24. The combination of a wheeled frame, a ratchet connected with the driving-axle thereof, a pawl coacting with the ratchet, means for operating the pawl to drive the vehicle, and a hood adjustably mounted adjacent to the ratchet, for the purpose specified.

25. In an agricultural implement, the combination of a beam, means for mounting and operating the same, a shank pivotally connected to the beam, a digging-tool attached to the shank, a colter-blade also attached to the shank, and a spring acting between the shank and beam yieldingly to hold the tool and colter-blade.

In testimony whereof I have signed my name to this specification in the presence of two subscribing witnesses.

EDUARDO IMPERIALE.

Witnesses:
 HARRY RICHARD STEVENS,
 A. G. MASSINNINO.